United States Patent
Bostick et al.

(10) Patent No.: US 10,166,478 B2
(45) Date of Patent: Jan. 1, 2019

(54) PREDICTIVE RECOMMENDATIONS FOR SKILLS DEVELOPMENT

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 14/870,246

(22) Filed: Sep. 30, 2015

(65) Prior Publication Data

US 2017/0087470 A1   Mar. 30, 2017

(51) Int. Cl.
| | |
|---|---|
| A63F 9/24 | (2006.01) |
| A63F 13/67 | (2014.01) |
| A63F 13/85 | (2014.01) |
| A63F 13/35 | (2014.01) |
| A63F 13/798 | (2014.01) |

(52) U.S. Cl.
CPC .............. *A63F 13/67* (2014.09); *A63F 13/35* (2014.09); *A63F 13/798* (2014.09); *A63F 13/85* (2014.09)

(58) Field of Classification Search
USPC .................................................... 463/40–42
See application file for complete search history.

(56) References Cited

U.S. PATENT DOCUMENTS

| | | | | |
|---|---|---|---|---|
| 7,806,759 | B2 * | 10/2010 | McHale | A63F 13/10 463/7 |
| 8,020,104 | B2 | 9/2011 | Robarts et al. | |
| 8,602,793 | B1 | 12/2013 | Sniedzins | |
| 9,120,016 | B2 * | 9/2015 | Epstein | A63F 13/10 |
| 9,778,737 | B1 * | 10/2017 | Strand | G06F 3/011 |
| 9,795,887 | B2 * | 10/2017 | Lin | A63F 13/795 |
| 2005/0252362 | A1 * | 11/2005 | McHale | G10H 1/368 84/616 |
| 2006/0166174 | A1 | 7/2006 | Rowe et al. | |
| 2006/0199157 | A1 | 9/2006 | Stamm et al. | |
| 2008/0138777 | A1 | 6/2008 | Rapoza et al. | |
| 2009/0069105 | A1 | 3/2009 | Holland | |
| 2012/0142429 | A1 * | 6/2012 | Muller | A63F 13/35 463/42 |
| 2014/0065585 | A1 | 3/2014 | Osborn | |
| 2014/0121559 | A1 | 5/2014 | Stevens et al. | |
| 2014/0173617 | A1 | 6/2014 | Cudak et al. | |
| 2014/0274242 | A1 | 9/2014 | Haswell | |
| 2014/0274355 | A1 | 9/2014 | George et al. | |

(Continued)

OTHER PUBLICATIONS

IBM; "Internet Games: Customized for Skill Enhancement"; IP.com Prior Art Database Technical Disclosure; IP.com No. 000016232; Electronic Publication: Jun. 21, 2003; pp. 1-2.

*Primary Examiner* — Masud Ahmed

(74) *Attorney, Agent, or Firm* — Andrew Aubert

(57) ABSTRACT

Measuring a skill set of a user as the user plays a game on a gaming device to gauge a skill level of the user across a set of defined metrics. Predictive analytics are used to anticipate upcoming challenges a user will face; based on the upcoming challenges for the user, games are recommended to increase the skill levels of the user to address and overcome the upcoming challenges.

15 Claims, 5 Drawing Sheets

(56) References Cited

U.S. PATENT DOCUMENTS

2014/0335490 A1 11/2014 Baarman et al.
2016/0005270 A1* 1/2016 Marr ..................... A63F 13/30
463/25

* cited by examiner

600

USER SKILL PROFILE 602

| SKILLS | LEVEL |
|---|---|
| REACTION TIME | 8 |
| ANALYSIS | 7 |
| HAND-EYE COORDINATION | 6 |
| NAVIGATION | 3 |
| STRATEGIC PUZZLE SOLVING | 2 |

ACTIVITY SKILL PROFILE 604

| SKILLS | LEVEL |
|---|---|
| NAVIGATION | 9 |
| ANALYSIS | 6 |
| STRATEGIC PUZZLE SOLVING | 4 |

VIDEO GAME PROFILE 606

| SKILLS | LEVEL |
|---|---|
| ANALYSIS | 7 |
| HAND-EYE COORDINATION | 6 |
| LEADERSHIP | 5 |
| SPATIAL REASONING | 3 |

PREDICTIVE RECOMMENDATIONS FOR SKILLS DEVELOPMENT

BACKGROUND

The present invention relates generally to the field of data processing, and more particularly to performance prediction.

Gaming is a multi-billion dollar industry. There are a variety of gaming systems and video game types utilized by individuals across all sectors of the population. Gaming devices include video game consoles, handheld gaming devices, computer systems, and mobile computing devices. These gaming devices support a variety of video game types, including, simulators, action, adventure, racing, strategy, puzzle, etc. As the video game industry develops, video games become more sophisticated requiring a variety of skills and skill levels from users.

Users also exist in the real world, outside of gaming environments. To get through daily tasks and challenges, users rely on skills developed throughout their lives. However, the skills developed by a user may not be tailored to match the tasks and challenges that user will experience.

SUMMARY

According to an aspect of the present invention, there is a method, computer program product, and/or system that performs the following operations (not necessarily in the following order): (i) a processor identifying an upcoming event in which a user will participate; (ii) the processor determining a set of desirable skills and a desirable skill level for each desirable skill in the set of desirable skills for participation in the upcoming event; (iii) the processor determining a set of user skills for the user and a first skill level for each user skill in the set of user skills; and (iv) the processor recommending a set of video games to the user based, at least in part, on a first level for a user skill in the set of user skills that is below a level for a desirable skill in the set of desirable skills, wherein the user skill corresponds to the desirable skill.

DETAILED DESCRIPTION

Figure 1:
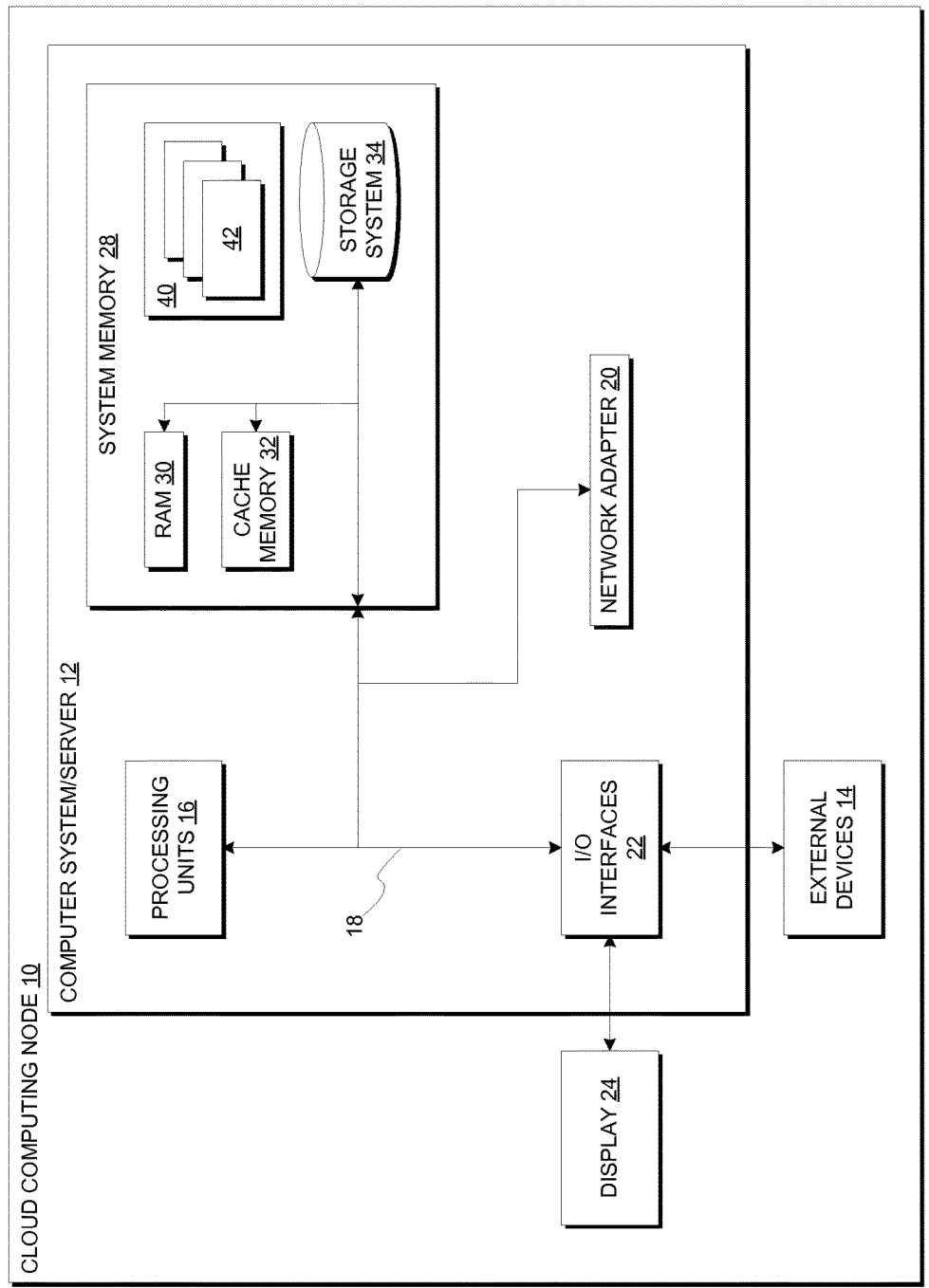
FIG. 1 depicts a cloud computing node used in a first embodiment of a system according to the present invention.

Measuring a skill set of a user as the user plays a game on a gaming device to gauge a skill level of the user across a set of defined metrics. Predictive analytics are used to anticipate upcoming challenges a user will face; based on the upcoming challenges for the user, games are recommended to increase the skill levels of the user to address and overcome the upcoming challenges. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM or other optical media, can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having set of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Set of program modules 42 generally carry out the functions and/or methodologies of embodiments of the invention as described herein.

Computer system/server 12 may also communicate with one or more external devices 14, such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks, such as a local area network (LAN), a general wide area network (WAN), and/or a public network (e.g., the Internet), via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
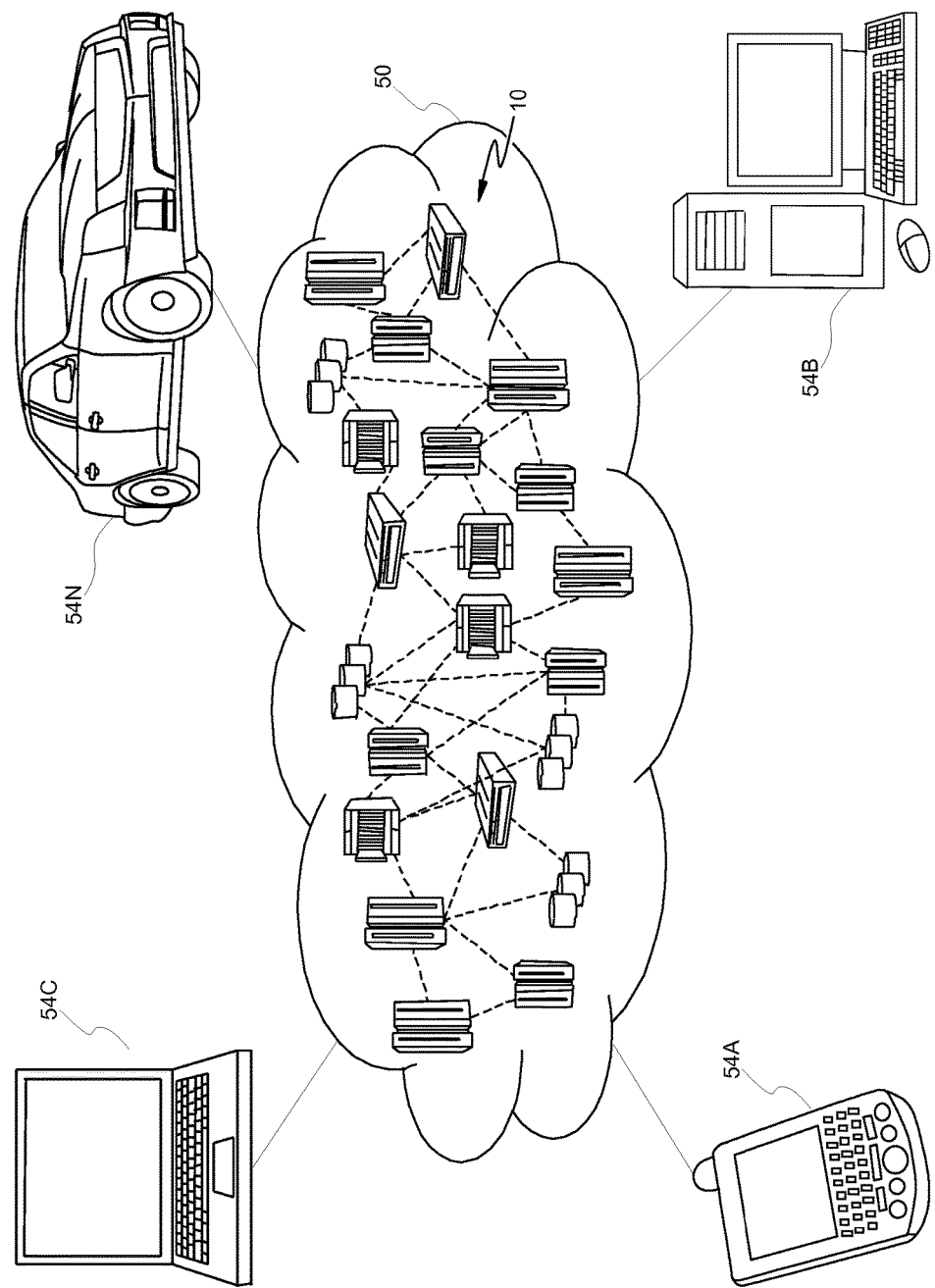
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes (e.g., cloud computing node 10) with which local computing devices used by cloud consumers, such as, for example, personal digital assistant (PDA) or cellular telephone 54A, desktop computer 54B, laptop computer 54C, and/or automobile computer system 54N may communicate. Cloud computing nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing node 10 and cloud computing environment 50 can communicate with any type of computerized device over any type of network and/or network addressable connection (e.g., using a web browser).

Figure 3:
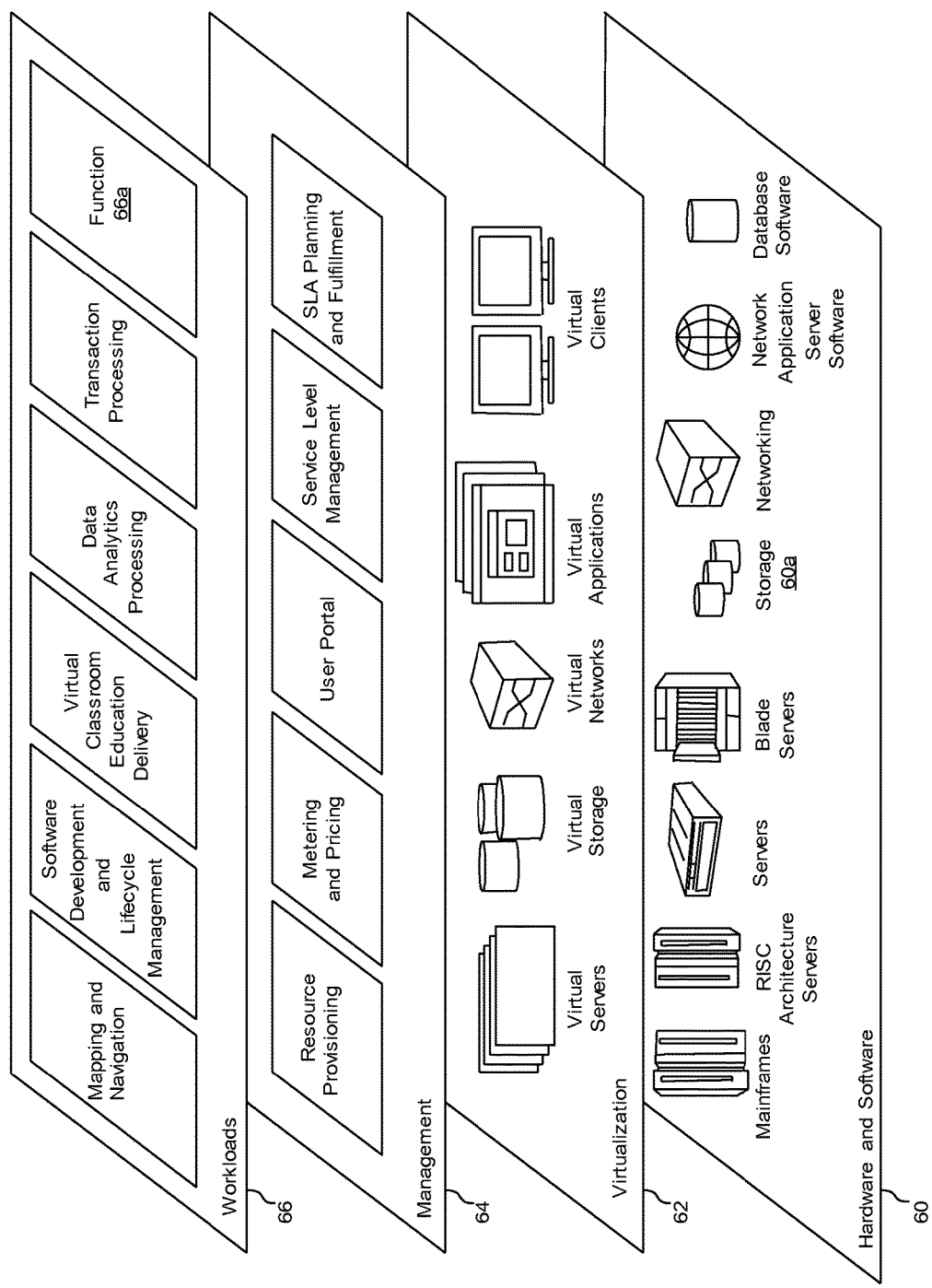
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
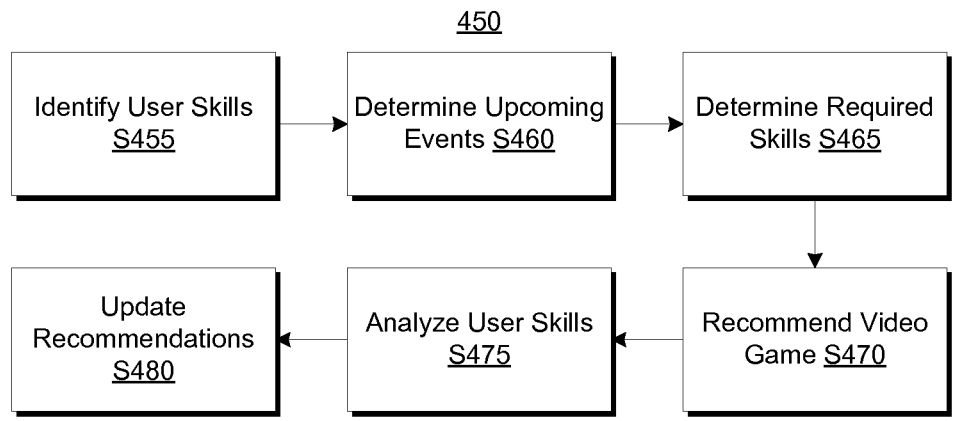
FIG. 4 is a flowchart showing a first embodiment method performed, at least in part, by the first embodiment system.
Figure 5:
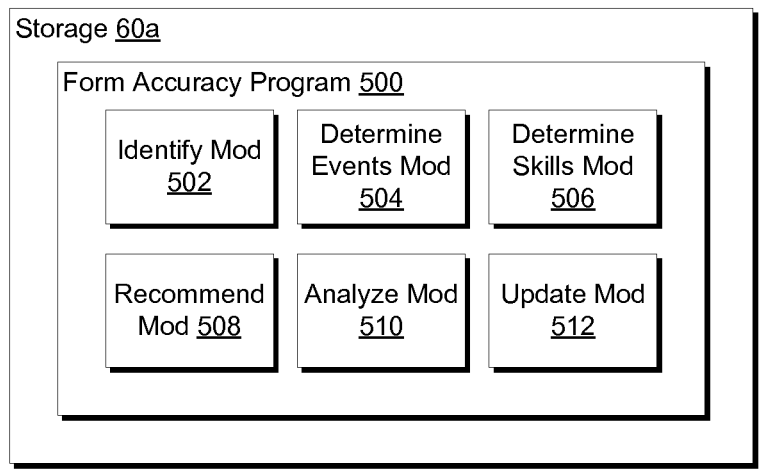
FIG. 5 is a block diagram view of a machine logic (e.g., software) portion of the first embodiment system.

FIG. 4 shows flowchart 450 depicting a method according to the present invention. FIG. 5 shows form accuracy program 500, which performs at least some of the method operations of flowchart 450. This method will now be discussed, over the course of the following paragraphs, with extensive reference to FIG. 4 (for the method operation blocks) and FIG. 5 (for the software blocks). One physical location where form accuracy program 500 of FIG. 5 may be stored is in storage 60a (see FIG. 3). In this example a user, Jane, is to compete in an upcoming orienteering event and seeks to improve her personal skills to compete better at the event. Jane consults computer system/server 12 (FIG. 1) for video game suggestions to better compete in the orienteering event.

Figures 6, 7:
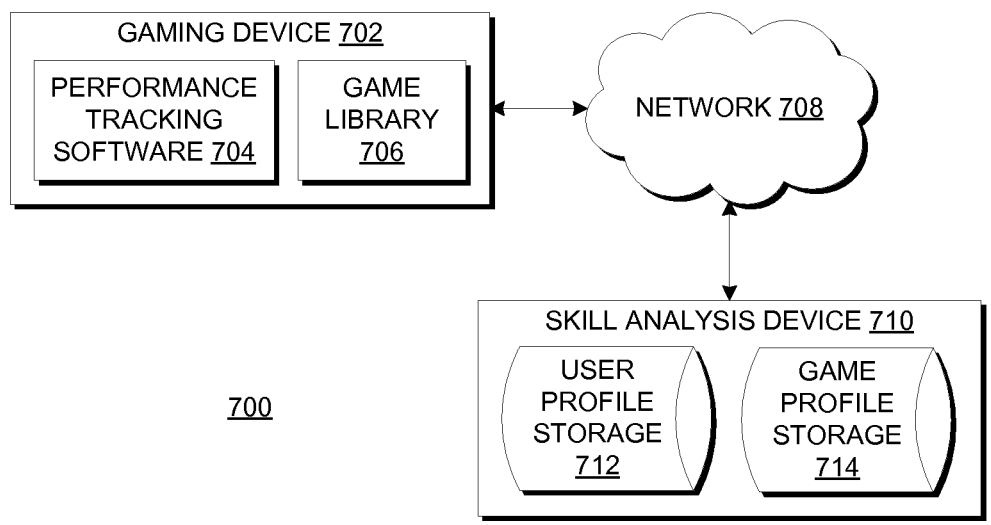
FIG. 6 depicts a profile environment of a second embodiments of a system according to the present invention.
FIG. 7 depicts a storage environment of a third embodiment of a system according to the present invention.

Processing begins at operation S455, where identify module ("mod") 502 identifies a set of skills of a user. In this example, identify mod 502 identifies a baseline profile for Jane to determine her initial skill level. In this example, identify mod 502 includes an initial video game to standardize Jane's baseline skill level against baseline skill levels of a variety of other users and identify mod 502 monitors Jane's gameplay on the initial video game. In some embodiments of the present invention, a set of skills includes, but is not limited to: (i) analysis; (ii) hand-eye coordination; (iii) navigation; (iv) reaction time; and/or (v) strategic puzzle solving. Alternatively, skills are knowledge-based skills including, but not limited to: geography, medicine, plant identification, and/or animal identification. In some embodiments of the present invention, identify mod 502 stores a set of skills of a user in a skill level repository. In some embodiments of the present invention, identify mod 502 stores a set of skills of a user in a cloud-based repository. In some embodiments of the present invention, identify mod 502 operates across a plurality of video game platforms (e.g., a console, a computer, a laptop, a mobile computing device, etc.). In this example, identify mod 502 stores Jane's set of skills as levels in user skill profile 602 (FIG. 6). In this example, identify mod 502 identifies Jane's set of skills as: (i) 8 for reaction time; (ii) 7 for analysis; (iii) 6 for hand-eye coordination; (iv) 3 for navigation; and (v) 2 for strategic puzzle solving.

In some embodiments of the present invention, identify mod 502 includes a gameplay performance tracking software. In some embodiments of the present invention, identify mod 502 identifies a set of skills of a user through an input device. In some embodiments of the present invention, identify mod 502 measures an amount of control exerted by a user on an initial video game. For example, identify mod 502 determines how a user maintains control of an avatar and/or a vehicle in an initial video game. In some embodiments of the present invention, identify mod 502 determines a reaction time of a user on an initial video game. For example, identify mod 502 determines an amount of time a user takes to respond to a prompt (sometimes also called an unexpected event) in an initial video game. In some embodiments of the present invention, identify mod 502 determines a reaction time based, at least in part, on an amount of time a user takes to press a button. In some embodiments of the present invention, identify mod 502 determines a reaction time based, at least in part, on an amount of time a user takes to make a gesture on a tactile interface (e.g., a touch screen). Alternatively, identify mod 502 determines a reaction time based, at least in part, on a user solving a puzzle in an initial video game. In some embodiments of the present invention, identify mod 502 determines a reaction time based, at least in part, on a user controlling movement of an avatar and/or a vehicle in an initial video game. In some embodiments of the present invention, identify mod 502 determines an analytic skill based, at least in part, on an amount of time a user takes to complete a mental puzzle. In some embodiments of the present invention, identify mod 502 determines an analytic skill based, at least in part, on a completion percentage of a mental puzzle and/or a time a user takes to achieve a completion percentage on a mental puzzle.

Processing proceeds to operation S460, where determine events mod 504 identifies a set of upcoming events for a user. In this example, determine events mod 504 receives an input from Jane describing an upcoming orienteering event. Alternatively, determine events mod 504 identifies an upcoming event through a method including, but not limited to, analyzing: (i) Jane's personal calendar; (ii) Jane's email; (iii) Jane's social media accounts; (iv) various calendars of groups with which Jane is associated or groups hosting events that Jane has previously attended; (v) Jane's recent video game activity; (vi) Jane's travel bookings and/or itinerary; (vii) Jane's recent physical activity; and/or (viii) information about Jane's friends. For example, information about Jane's friends includes events the friends are attending, geographical proximity between Jane and the friend, and frequency of contact between Jane and her friend. An upcoming event is not limited to a "real life" activity, but includes online events and events within video games. For example, different upcoming events for Jane include a group raid in a massively multiplayer online role-playing game (MMORPG), unlocking a new level on a first-person shooter (FPS) video game, and a college physics exam.

In some embodiments of the present invention, determine events mod 504 identifies a set of future events using a natural language processor. In some embodiments of the present invention, determine events mod 504 uses a natural language processor to parse calendar events and/or travel plans. In some embodiments of the present invention, determine events mod 504 identifies a set of upcoming events for a user using a prediction. In some embodiments of the present invention, determine events mod 504 assigns a confidence metric for a prediction. In some embodiments of the present invention, determine events mod 504 assigns a greater confidence metric value to a prediction based, at least in part, on an upcoming event on a personal calendar. In some embodiments of the present invention, determine events mod 504 assigns a lower confidence metric value to a prediction based, at least in part, on a user's recent video game activity.

Processing proceeds to operation S465, where determine skills mod 506 determines a set of skills required to complete an upcoming event. In this example, determine skills mod 506 determines that orienteering, Jane's upcoming event, requires three skills: (i) analysis; (ii) navigation; and (iii) strategic puzzle solving. In some embodiments of the present invention, determine skills mod 506 researches the event in general (e.g., searching to determine what orienteering is) or researches the specific event (e.g., searching the physics course syllabus to determine the content of the exam). Here, determine skills mod 506 determines the specific orienteering event Jane will attend is a middle distance orienteering event, emphasizing navigation. Determine skills mod 506 stores the set of skills required for the upcoming orienteering event as levels in activity skill profile 604 (FIG. 6). Determine skills mod 506 determines the skills required for Jane's upcoming orienteering event are: (i) 9 for navigation; (ii) 6 for analysis; and (iii) 4 for strategic puzzle solving. In some embodiments of the present invention, determine skills mod 506 receives adjustments to the activity profile from the user.

Processing proceeds to operation S470, where recommend mod 508 recommends a set of video games to a user. In this example, recommend mod 508 looks to user skill profile 602 and activity skill profile 604 to determine the skills at which Jane must improve to complete the upcoming orienteering event. Recommend mod 508 determines that Jane has sufficient analysis skills to complete the upcoming orienteering event, but must improve her navigation skills by seven levels and her strategic puzzle solving skills by two levels. Therefore, recommend mod 508 determines that Jane should play a video game that involves a significant amount of navigation and a variety of strategic puzzle solving. In some embodiments of the present invention, recommend mod 508 maintains a set of game profiles, and the set of game profiles include indications of the skills a user can improve and projected levels a user can reach by playing the game. Here, recommend mod 508 recommends that Jane play a first-person role-playing adventure game with a large open world. Recommend mod 508 lists a variety of game titles for Jane to consider and, for some of the game titles, recommend mod 508 suggests gameplay options Jane should use while playing. For example, recommend mod 508 suggests that Jane turn off any mini-map displays to assist in the development of Jane's navigation skills.

In some embodiments of the present invention, recommend mod 508 recommends a set of video games based, at least in part, on weighting various skills. In some embodiments of the present invention, recommend mod 508 assigns a greater weight to a skill having a greater difference between a user skill and a skill required for an upcoming event. In some embodiments of the present invention, recommend mod 508 assigns a lower weight to a skill having a smaller difference between a user skill and a skill required for an upcoming event. For example, Jane has a difference between her user skills and the set of skills required for her orienteering event of: (i) navigation, 6; (ii) strategic puzzle solving, 2; and (iii) analysis, −1. In this example, recommend mod 508 would weight navigation the highest and analysis the lowest, with strategic puzzle solving between navigation and analysis.

Processing proceeds to operation S475, where analyze mod 510 analyzes a modified set of skills of a user. In this example, analyze mod 510 analyzes Jane's gameplay of the suggested video game and determines that Jane's navigation skills and strategic puzzle solving skills have improved. In some embodiments of the present invention, analyze mod 510 updates a set of skills of a user in a skill level repository. In some embodiments of the present invention, analyze mod 510 updates a set of skills of a user in a cloud-based repository. In some embodiments of the present invention, analyze mod 510 operates across a plurality of video game platforms (e.g., a console, a computer, a laptop, a mobile computing device, etc.). In this example, analyze mod 510 updates user skill profile 602 (not separately shown) to indicate that Jane's new skill levels are: (i) 7 for navigation; and (ii) 5 for strategic puzzle solving. In some embodiments of the present invention, analyze mod 510 transmits the updated skill levels to a user. In some embodiments of the present invention, analyze mod 510 returns to operation S470 and, based, at least in part, on the updated user skill profile, recommends a new video game.

In some embodiments of the present invention, analyze mod 510 includes a gameplay performance tracking software. In some embodiments of the present invention, analyze mod 510 identifies a set of skills of a user through an input device. In some embodiments of the present invention, analyze mod 510 updates a user skill profile based on a recommended set of video games. In some embodiments of the present invention, analyze mod 510 measures an amount of control exerted by a user on a recommended video game. In some embodiments of the present invention, analyze mod 510 determines a reaction time of a user on a recommended video game. In some embodiments of the present invention, analyze mod 510 determines a reaction time based, at least in part, on an amount of time a user takes to press a button. In some embodiments of the present invention, analyze mod 510 determines a reaction time based, at least in part, on an amount of time a user takes to make a gesture on a tactile interface. Alternatively, analyze mod 510 determines a reaction time based, at least in part, on a user solving a puzzle in a recommended video game. In some embodiments of the present invention, analyze mod 510 determines a reaction time based, at least in part, on a user controlling movement of an avatar and/or a vehicle in a recommended video game. In some embodiments of the present invention, analyze mod 510 determines an analytic skill based, at least in part, on an amount of time a user takes to complete a mental puzzle. In some embodiments of the present invention, analyze mod 510 determines an analytic skill based, at least in part, on a completion percentage of a mental puzzle and/or a time a user takes to achieve a completion percentage on a mental puzzle.

Processing terminates at operation S480, where update mod 512 updates a set of game profiles. In this example, update mod 512 updates the profile for the suggested video game to include Jane's results. In some embodiments of the present invention, update mod 512 compares Jane's results against the results of a variety of other users to determine if Jane met expectations, exceeded expectations, or failed to meet expectations. Here, by updating the set of game profiles, update mod 512 can improve future recommendations to Jane and to other users. For example, while achieving significant improvement in her navigation skills, Jane did not reach the desired level of navigation skills for the orienteering event. Update mod 512 determines that this shortfall was due to the relative ease of the recommended game, as opposed to a failing on the part of Jane and adjusts the profile of the game. In some embodiments of the present invention, update mod 512 also looks at the results of the upcoming event to determine if the activity profile was accurate. Here, while achieving a personal best in the orienteering event, Jane did not finish as well as desired; therefore, update mod 512 determines that the activity profile was accurate.

III. Further Comments and/or Embodiments

Some embodiments of the present invention recognize the following facts, potential problems, and/or potential areas for improvement with respect to the current state of the art: (i) skills developed to play video games (e.g., football video games, music video games, etc.) do not necessarily improve skills in performing those tasks outside of video games (e.g., playing football, performing in a band, etc.); (ii) some individuals view playing video games as an unproductive use of time; (iii) certain attributes of gaming develop skills transferrable outside of gaming; and/or (iv) video games can improve a user's hand-eye coordination, reaction times, and strategic thinking, among other skills.

FIG. 6 depicts profile environment 600. Profile environment 600 includes user skill profile 602, activity skill profile 604, and video game profile 606. In some embodiments of the present invention, profile environment 600 contains a variety of profiles for users, upcoming events, and video games. In some embodiments of the present invention, a computer system/server determines a skill quantity based, at least in part, on a relative level of achievement (sometimes called a level). Alternatively, a computer system/server uses a qualitative metric or various other quantitative metrics to describe a skill achievement (e.g., a percentage, a descriptor such as "good," etc.).

User skill profile 602 depicts a user that has skills at a variety of levels. Those skills include, but are not limited to: (i) reaction time at level 8; (ii) analysis at level 7; (iii) hand-eye coordination at level 6; (iv) navigation at level 3; and (v) strategic puzzle solving at level 2. In some embodiments of the present invention, a set of skills depicted in a user profile includes a wider range of skills that a computer system/server can measure. Additional skills include, but are not limited to: (i) leadership; (ii) spatial reasoning; (iii) logic; (iv) memory; and/or (v) multitasking. In some embodiments of the present invention, a subset of the set of skills are interrelated; for example, as a user's skill at hand-eye coordination increases, it is likely that the user's skill at reaction time will also increase (i.e., the user's reaction time decreases).

Activity skill profile 604 depicts a future activity that requires a variety of skills at certain levels. Those skills include: (i) navigation at level 9; (ii) analysis at level 6; and (iii) strategic puzzle solving at level 4. In some embodiments of the present invention, an activity skill profile includes a set of skills required to complete the activity, as determined by a computer system/server. In some embodiments of the present invention, a computer system/server receives as an input suggested variations in a skill level or additional skills for an activity skill profile.

Video game profile 606 depicts a video game that can assist a user in achieving a set of skills at a variety of levels. Those skills include: (i) analysis at level 7; (ii) hand-eye coordination at level 6; (iii) leadership at level 5; and (iv) spatial reasoning at level 3. In some embodiments of the present invention, a computer system/server can update the skill levels in video game profile 606 based, at least in part, on results of a user. In some embodiments of the present invention, a computer system/server requires a threshold of users to achieve results not suggested by a game profile before adjusting that game profile.

FIG. 7 depicts storage environment 700. Storage environment 700 includes: gaming device 702; network 708; and skill analysis device 710. Gaming device 702 includes: performance tracking software 704; and game library 706. Skill analysis device 710 includes: user profile storage 712; and game profile storage 714.

Gaming device 702 may be a laptop computer, a tablet computer, a netbook computer, a personal computer (PC), a desktop computer, a personal digital assistant (PDA), a smart phone, or any programmable electronic device capable of communicating with skill analysis device 710 via network 708 and on which a user can play a video game.

Performance tracking software 704 is any software specifically formatted to determine a user performance on a video game. In some embodiments of the present invention, performance tracking software 704 evaluates a set of skills of a user. In some embodiments of the present invention, performance tracking software 704 determines a skill level of a user for a variety of skills. In some embodiments of the present invention, performance tracking software 704 determines a skill level of a user based, at least in part, on a set of achievements within the video game.

Game library 706 is a set of video games (being any games that a user plays on a mobile computing device, a video game console, a dedicated console, a computer, a laptop, etc.). In some embodiments of the present invention, game library 706 includes a variety of games for which video game profiles exist. In some embodiments of the present invention, a computer system/server must create a video game profile for a video game in game library 706. In some embodiments of the present invention, a user can purchase and/or download new video games through game library 706.

Network 708 can be, for example, a local area network (LAN), a wide area network (WAN) such as the Internet, or a combination of the two, and can include wired, wireless, or fiber optic connections. In general, network 708 can be any combination of connections and protocols that will support communications between skill analysis device 710 server and client sub-systems. In some embodiments of the present invention, network 708 can be a cloud computing environment. If network 708 is a cloud computing environment, gaming device 702 and skill analysis device 710 are cloud computing nodes.

Skill analysis device 710 may be a laptop computer, a tablet computer, a netbook computer, a personal computer (PC), a desktop computer, a personal digital assistant (PDA), a smart phone, or any programmable electronic device capable of communicating with gaming device 702 via network 708.

User profile storage 712 is one location where user skill profile 602 (FIG. 6) can be saved. In some embodiments of the present invention, user profile storage 712 is a central repository for the profiles of a variety of users. Alternatively, a computer system/server maintains a user profile storage 712 locally.

Game profile storage 714 is one location where video game profile 606 (FIG. 6) can be saved. In some embodiments of the present invention, game profile storage 714 is a central repository for the profiles of a variety of games. Alternatively, a computer system/server maintains a game profile storage 714 locally. In some embodiments of the present invention, game profile storage 714 maintains a set of video game profiles for the various video games maintained in game library 706.

Not separately shown is a storage for activity skill profiles, such as activity skill profile 604 (FIG. 6). In some embodiments of the present invention, an activity profile storage is similar in nature and function to either user profile storage 712 and/or game profile storage 714. In some embodiments of the present invention, an activity profile storage may purge activity skill profiles after an activity has occurred.

Some embodiments of the present invention may include one, or more, of the following features, characteristics, and/or advantages: (i) correlating development of skills while playing video games with utilization of skills in real life situations; (ii) transferring skills developed by a user while playing a video game to other tasks faced by the user; (iii) improving a user's hand-eye coordination, reaction times, and/or strategic thinking; (iv) applying mastery of video game skills to real life situations; (v) determining which video games a user should play to improve specified skills in anticipation of a real life challenge; and/or (vi) tailoring a video game selection to address specific skills for a user.

Some embodiments of the present invention may include one, or more, of the following features, characteristics, and/or advantages: (i) tracking a user's performance against a set of defined metrics (e.g., reaction time, analytics skills, level of control exerted, etc.); (ii) using predictive analytics to determine future challenges a user may face; (iii) identifying pre-determined skills required to complete a future challenge; (iv) comparing identified skill levels to complete a challenge with a set of skills in a user's profile; (v) determining which video games are most appropriate for a user to play to increase the user's skills for an upcoming activity; (vi) tracking a user's skill levels over time; and/or (vii) tracking the effectiveness of a variety of video games at increasing a user's skill level.

Some embodiments of the present invention may include one, or more, of the following features, characteristics, and/or advantages: (i) storing a user's gaming performance against metrics in a cloud-based skill level repository based, at least in part, on other games or external activities outside of gaming; (ii) using data sources such as game playing history, personal calendar data, and social network posts to predict future challenges; (iii) identifying future activities for a user where the skill level required to complete the future activity is greater than the user's current skill level; and/or (iv) recommending video games already in a user's gaming library and video games proven to be the most efficient at increasing particular skills.

Some embodiments of the present invention may include one, or more, of the following features, characteristics, and/or advantages: (i) functioning across gaming platforms to gauge the skill level of a user; (ii) using predictive analytics to forecast a user's upcoming activities (whether other video games or external activities outside of gaming); (iii) directing a user to suitable gameplay situations to ensure the user's skill set is sufficient to participate in forecasted activities; (iv) using video game recommendations and video game performance tracking to gauge the impact on a user's abilities across a variety of attributes, a variety of users, and a variety of gaming platforms to determine which video games aid users in the development of specific skills; (v) providing feedback to a user to enable self-learning; (vi) providing feedback to improve the video game recommendation engine; and/or (vii) using data sources such as video game playing history, personal calendar data, and/or social network posts to predict future challenges.

Some embodiments of the present invention may include one, or more, of the following features, characteristics, and/or advantages: (i) enabling gaming device manufacturers and video game software developers to align gaming devices and video games with practical applications; (ii) leveraging extant software to exchange information among users and gaming devices; and/or (iii) providing an opportunity for cloud-based gaming solutions to extend video game-based skill acquisition into all aspects of life.

Some embodiments of the present invention track a user's performance against a set of metrics. Some embodiments of the present invention use a variety of metrics, including, but not limited to: (i) reaction time, a measure of time for a user to respond to an unexpected event; (ii) analytic skills, a measure of time for a user to solve a mental puzzle; and/or (iii) control, a measure of how a user handles in-game movement of an avatar or a vehicle.

In some embodiments of the present invention, a computer system/server measures a user's performance by a performance tracking software that works in conjunction with the video game the user played. In some embodiments of the present invention, a performance tracking software records a set of metrics in a central cloud-based repository (e.g., user profile storage 712). In some embodiments of the present invention, a user profile storage includes user skill profiles for a variety of users. In some embodiments of the present invention, various gaming devices can update a user profile storage, allowing a computer system/server to synchronize a user skill profile across various video games and gaming platforms.

In some embodiments of the present invention, a computer system/server uses predictive analytics to determine future challenges a user may face. In some embodiments of the present invention, future challenges faced by a user are activities requiring a degree of competence of skills from the user. In some embodiments of the present invention, future challenges faced by a user include other video games a user is likely to play based, at least in part, on the user's gaming history. In some embodiments of the present invention, future challenges faced by a user include an external activity that the user will attend.

Some embodiments of the present invention employ predictive analytics. In some embodiments of the present invention, a computer system/server uses predictive analytics to determine future challenges faced by a user. In some embodiments of the present invention, a computer system/server performs predictive analytics on a set of factors including, but not limited to: (i) gaming history; (ii) personal calendar data; (iii) social network posts; (iv) posted travel plans; (v) recent activity; and/or (vi) user input. In some embodiments of the present invention, a computer system/server uses predictive analytics to analyze and rank a set of future activities to determine a likelihood of what user will encounter.

In some embodiments of the present invention, a computer system/server identifies a calendar entry labeled "Grand Canyon hike" and assigns a high probability to a hiking challenge. In some embodiments of the present invention, a computer system/server identifies that a user has played the first three video games in a series and determines that a fourth video game in the series will be released in a month, the computer system/server assigns a high probability that the user will play the fourth video game in the series. In some embodiments of the present invention, a computer system/server employs a natural language processor to deep parse a set of social network posts and a set of travel plans posted to websites and public forums. In some embodiments of the present invention, a computer system/server determines a set of future challenges for a user based, at least in part, on an input from the user.

Some embodiments of the present invention may include one, or more, of the following features, characteristics, and/or advantages: (i) employing a game performance tracking software to track a user's progress and update the user's skill level as the user's performance improves; and/or (ii) improving the accuracy of a video game recommendation engine, which recommends a set of video games to a user to efficiently improve the user's skills. In some embodiments of the present invention, a computer system/server identifies a set of skills required to complete a future activity a user will face. In some embodiments of the present invention, a computer system/server determines skills at which a user must improve to complete a future activity.

In some embodiments of the present invention, a computer system/server uses a video game recommendation engine to determine which video games are most appropriate for a user to play to increase the user's skills for an upcoming activity. In some embodiments of the present invention, a video game recommendation engine weights a set of skills based, at least in part, on which skills a user must improve the most.

In some embodiments of the present invention, a video game recommendation engine is a cloud-based service. In some embodiments of the present invention, a computer system/server seeds a video game recommendation engine with profiles about a variety of video games describing the skills a video game helps improve. In some embodiments of the present invention, a video game recommendation engine recommends video games based, at least in part, on a user's current library. Alternatively, a video game recommendation engine recommends video games based, at least in part, on efficiency of increasing desired skill levels. In some embodiments of the present invention, a video game engine recommends a set of video games based, at least in part, on a set of prior users.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
    receiving a first user skill profile data set including information indicative of a plurality of first user skill parameter values respectively corresponding to a first user's competency with respect to a physical activity related skill parameter;
    receiving a training video game data set including information indicative of: (i) identities of a plurality of training video games, and (ii) for each given training video game of the plurality of training video games, an indication of a set of respectively associated skill parameter(s) that the given training video game helps to develop in players of the given training video game;
    receiving a competitive event data set including information indicative of: (i) an identity of a first competitive event in which the first user is scheduled to participate, with the first competitive event including a set of physical activity(ies), and (ii) a plurality of first competitive event skill parameter values respectively corresponding to relative amounts of skill parameters that are considered necessary for a user to complete the set of physical activity(ies) included in the first competitive event; and
    selecting, by machine logic based rules, a subset of recommended training video games of the plurality of training video games based, at least in part upon all of the following: (i) the first user skill profile data set, (ii) the training video game data set, and (iii) the competitive event data set.

2. The method of claim 1 further comprising:

determining, by machine logic based rules, priority values respectively corresponding to each recommended training video game of the subset of recommended training video games, with the determination of the priority values being based, at least in part upon all of the following: (i) the first user skill profile data set, (ii) the training video game data set, and (iii) the competitive event data set.

3. The method of claim 2 further comprising:

determining a video game training regimen based on the priority values for the recommended training video games of the subset of recommended training video games.

4. The method of claim 3 further comprising:

executing the training video games of the subset of recommended training video games based, at least in part, upon the video game training regimen.

5. The method of claim 1 wherein the set of physical activity(ies) included in the first competitive event include at least one of the following type(s) of physical activity: (i) hand-eye coordination, (ii) spatial-reasoning, and (iii) hiking.

6. A computer program product (CPP) comprising:

a machine readable storage device; and computer code stored on the machine readable storage device, with the computer code including instructions for causing a processor(s) set to perform operations including the following:

receiving a first user skill profile data set including information indicative of a plurality of first user skill parameter values respectively corresponding to a first user's competency with respect to a physical activity related skill parameter, receiving a training video game data set including information indicative of: (i) identities of a plurality of training video games, and (ii) for each given training video game of the plurality of training video games, an indication of a set of respectively associated skill parameter(s) that the given training video game helps to develop in players of the given training video game, receiving a competitive event data set including information indicative of: (i) an identity of a first competitive event in which the first user is scheduled to participate, with the first competitive event including a set of physical activity(ies), and (ii) a plurality of first competitive event skill parameter values respectively corresponding to relative amounts of skill parameters that are considered necessary for a user to complete the set of physical activity(ies) included in the first competitive event, and selecting, by machine logic based rules, a subset of recommended training video games of the plurality of training video games based, at least in part upon all of the following: (i) the first user skill profile data set, (ii) the training video game data set, and (iii) the competitive event data set.

7. The CPP of claim 6 wherein the computer code further includes instructions for causing the processor(s) set to perform the following operations:

determining, by machine logic based rules, priority values respectively corresponding to each recommended training video game of the subset of recommended training video games, with the determination of the priority values being based, at least in part upon all of the following: (i) the first user skill profile data set, (ii) the training video game data set, and (iii) the competitive event data set.

8. The CPP of claim 7 wherein the computer code further includes instructions for causing the processor(s) set to perform the following operations:

determining a video game training regimen based on the priority values for the recommended training video games of the subset of recommended training video games.

9. The CPP of claim 8 wherein the computer code further includes instructions for causing the processor(s) set to perform the following operations:

executing the training video games of the subset of recommended training video games based, at least in part, upon the video game training regimen.

10. The CPP of claim 6 wherein the set of physical activity(ies) included in the first competitive event include at least one of the following type(s) of physical activity: (i) hand-eye coordination, (ii) spatial-reasoning, and (iii) hiking.

11. A computer system (CS) comprising:

a processor(s) set;

a machine readable storage device; and computer code stored on the machine readable storage device, with the computer code including instructions for causing the processor(s) set to perform operations including the following:

receiving a first user skill profile data set including information indicative of a plurality of first user skill parameter values respectively corresponding to a first user's competency with respect to a physical activity related skill parameter, receiving a training video game data set including information indicative of: (i) identities of a plurality of training video games, and (ii) for each given training video game of the plurality of training video games, an indication of a set of respectively associated skill parameter(s) that the given training video game helps to develop in players of the given training video game, receiving a competitive event data set including information indicative of: (i) an identity of a first competitive event in which the first user is scheduled to participate, with the first competitive event including a set of physical activity(ies), and (ii) a plurality of first competitive event skill parameter values respectively corresponding to relative amounts of skill parameters that are considered necessary for a user to complete the set of physical activity(ies) included in the first competitive event, and selecting, by machine logic based rules, a subset of recommended training video games of the plurality of training video games based, at least in part upon all of the following: (i) the first user skill profile data set, (ii) the training video game data set, and (iii) the competitive event data set.

12. The CS of claim 11 wherein the computer code further includes instructions for causing the processor(s) set to perform the following operations:

determining, by machine logic based rules, priority values respectively corresponding to each recommended training video game of the subset of recommended training video games, with the determination of the priority values being based, at least in part upon all of the following: (i) the first user skill profile data set, (ii) the training video game data set, and (iii) the competitive event data set.

13. The CS of claim 12 wherein the computer code further includes instructions for causing the processor(s) set to perform the following operations:

determining a video game training regimen based on the priority values for the recommended training video games of the subset of recommended training video games.

14. The CS of claim 13 wherein the computer code further includes instructions for causing the processor(s) set to perform the following operations:

executing the training video games of the subset of recommended training video games based, at least in part, upon the video game training regimen.

15. The CS of claim 11 wherein the set of physical activity(ies) included in the first competitive event include at least one of the following type(s) of physical activity: (i) hand-eye coordination, (ii) spatial-reasoning, and (iii) hiking.

* * * * *